United States Patent [19]
Lisak

[11] Patent Number: 5,140,503
[45] Date of Patent: Aug. 18, 1992

[54] HEADLAMP AIMING AND LEVELING APPARATUS

[75] Inventor: Stephen P. Lisak, Arab, Ala.

[73] Assignee: Textron Inc., Providence, R.I.

[21] Appl. No.: 571,752

[22] Filed: Aug. 23, 1990

[51] Int. Cl.⁵ ............................................. B60Q 1/00
[52] U.S. Cl. ...................................... 362/61; 362/80; 362/419; 33/288
[58] Field of Search ................... 362/61, 80, 418, 419, 362/311, 420; 33/288, 333, 374, 375, 379; 356/249

[56] References Cited

U.S. PATENT DOCUMENTS

| | | | |
|---|---|---|---|
| 4,794,495 | 12/1988 | McMahan et al. | 362/419 |
| 4,802,067 | 1/1989 | Ryder et al. | 362/61 |
| 4,916,683 | 4/1990 | Nagasawa | 362/61 |
| 4,970,629 | 11/1990 | McMahan | 362/287 |
| 5,050,048 | 9/1991 | Hendrick et al. | 362/61 |
| 5,055,980 | 10/1991 | Mochizuki | 362/61 |

*Primary Examiner*—Ira S. Lazarus
*Assistant Examiner*—Sue Hagarman
*Attorney, Agent, or Firm*—Trexler, Bushnell, Giangiorgi & Blackstone, Ltd.

[57] ABSTRACT

A headlamp aiming and leveling apparatus includes a level member having a housing and an indicating device for indicating the condition of the housing relative to a level condition and located within the housing, at least a portion of the housing being transparent to permit viewing of the indicating device therewithin. An adjustment member is operatively coupled to the housing for adjusting the position thereof, and thereby adjusting the indication given by the indicating device. A retaining clip mounts the level member to a headlamp. The retaining clip includes a locking portion for engaging the housing, a retaining portion for retaining the retaining clip in assembled relation with the headlamp, and a cooperating adjustment portion for cooperating with the adjustment member to achieve adjustment of the indicating device so as to indicate a level position when the associated headlamp is in a desired level condition. Accordingly, upon installation of the headlamp upon an automotive vehicle, the headlamp may be adjusted until the indicating device again indicates a level condition, to thereby assure proper leveling and aiming of the headlamp beam relative to a vehicle upon which the headlamp is installed.

17 Claims, 4 Drawing Sheets

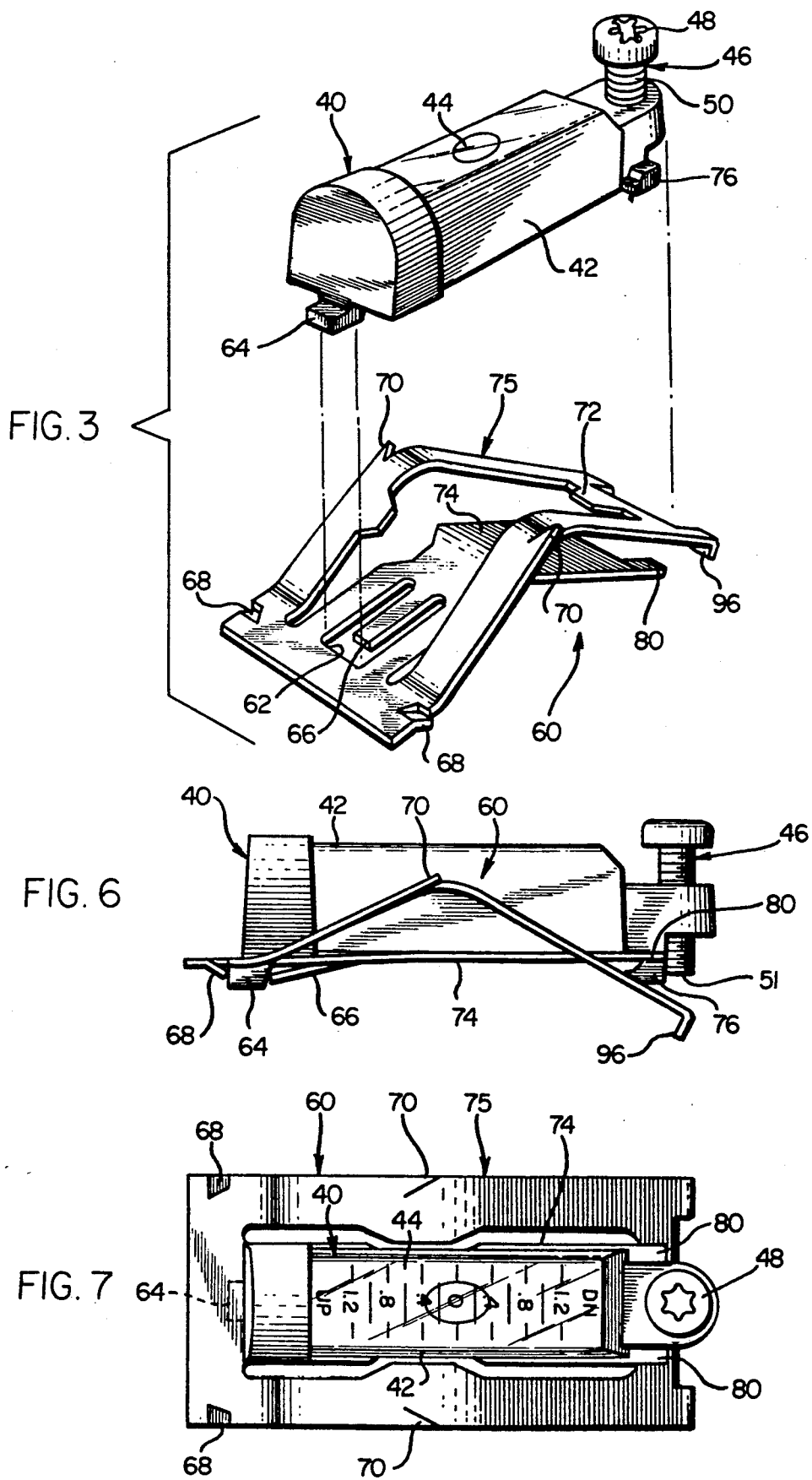

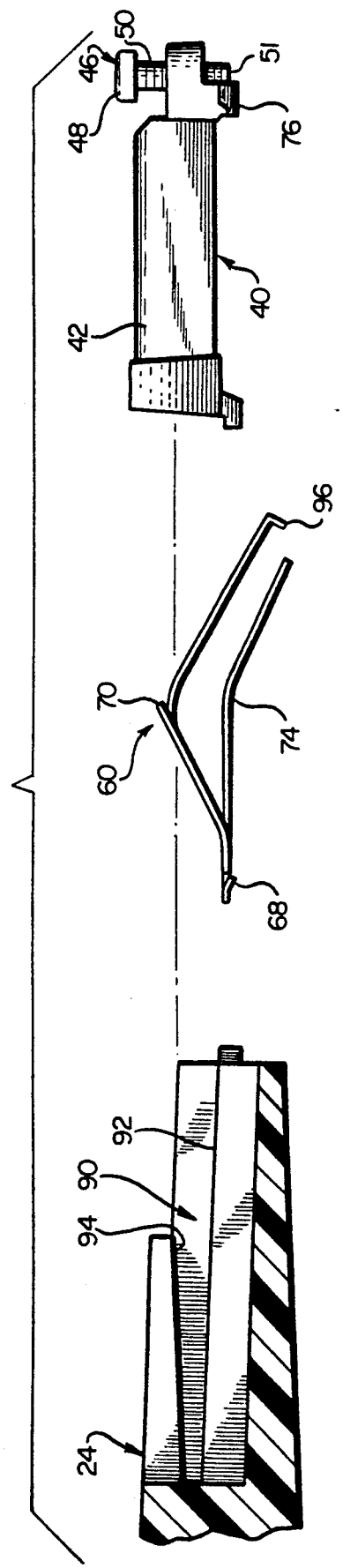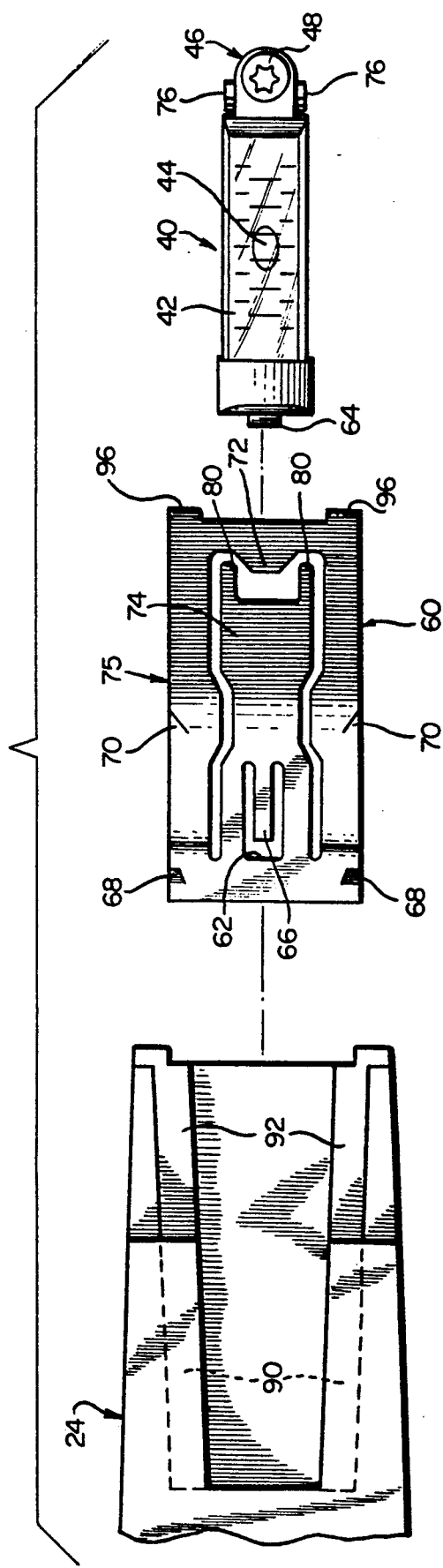

HEADLAMP AIMING AND LEVELING APPARATUS

BACKGROUND OF THE INVENTION

This invention relates generally to the adjusting and leveling of automotive headlamp assemblies, and more particularly to a novel and improved headlamp aiming and leveling device for facilitating the proper aiming and leveling of a headlamp beam upon installation of a headlamp to an automotive vehicle, or at any time thereafter.

A number of headlamp adjustment and aiming systems have been proposed for automotive vehicle headlamps. Generally speaking, separately mounted, sealed-beam type headlamps require independent adjustment. However, the more recently developed unitary housing headlamp assemblies often require but a single adjustment per assembly. Such modern headlamp assemblies also often include automated or semi-automated adjustment mechanisms for adjusting both the vertical and horizontal aiming of the lamp beam.

There has heretofore been proposed one particularly novel and useful headlamp aiming and leveling device, in Ryder et al U.S. Pat. No. 4,802,067. In this type of leveling and aiming device, a level indicating device such as a bubble-type or spirit level is provided in a form which can be easily installed on a vehicle headlamp assembly during manufacture. The level indicating device is adjusted relative to the headlamp housing so as to indicate a level condition when the headlamp housing is in a position or orientation wherein the headlamp beam is at its desired level condition. Suitable means are provided to lock the level indicating device into this position once the desired level orientation of the headlamp housing is achieved, and once the necessary orientation of the level indicating device relative to the housing is reached such that the device gives a level indication. Thereafter, upon installation of the headlamp to a vehicle, or at any other time when it is desired to check or realign the headlamp, it is necessary only to adjust the headlamp until the level indicating device again gives a level indication, with the vehicle standing on a level surface.

However, there is room for yet further improvement. In particular, the present invention provides an improved system and apparatus for facilitating mounting of the level indicating device to the headlamp assembly.

OBJECTS AND SUMMARY OF THE INVENTION

It is a general object of this invention to provide an improved headlamp aiming and leveling apparatus including an improved means for assembling a level indicating means or member to an automotive headlamp assembly.

A related object is to provide a leveling apparatus in accordance with the foregoing object which further permits adjustment of the assembly, once assembled with the automotive headlamp assembly to give the desired indication of a level condition of the headlamp when the lamp is in such a level condition.

Briefly, and in accordance with the foregoing objects, a headlamp aiming and leveling apparatus comprises a level member including a housing and indicating means for indicating the condition of the housing relative to a level condition and located within the housing, at least a portion of the housing being transparent to permit viewing of the indicating means, and an adjustment member operatively coupled to the housing for adjusting the position thereof, and thereby adjusting the indication given by the indicating means. A retaining clip for mounting the level member to a headlamp includes locking means for engaging the housing, and means for retaining the clip in assembled relation with the headlamp. Cooperating adjustment means cooperate with the adjustment member to achieve adjustment of the indicating means to indicate a level position when the headlamp is in a desired level condition; and when the headlamp is installed upon an automotive vehicle, the headlamp may be adjusted until the indicating means again indicates the level condition to assure proper leveling and aiming of the headlamp beam relative to a vehicle upon which it is installed.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIG. 3 is an exploded perspective view of level member and retaining clip member of the invention, indicating the manner of assembly thereof;

FIG. 4 is an exploded side elevation, similar to FIG. 1, indicating assembly of the components of the invention with a complementary formed mounting portion of a headlamp assembly;

FIG. 5 is a top plan view of the exploded view of FIG. 4;

FIG. 6 is a side elevation of an assembled level member and retaining clip member of the invention;

FIG. 7 is a top plan view of FIG. 6;

DETAILED DESCRIPTION OF THE ILLUSTRATED EMBODIMENT

Figure 1:
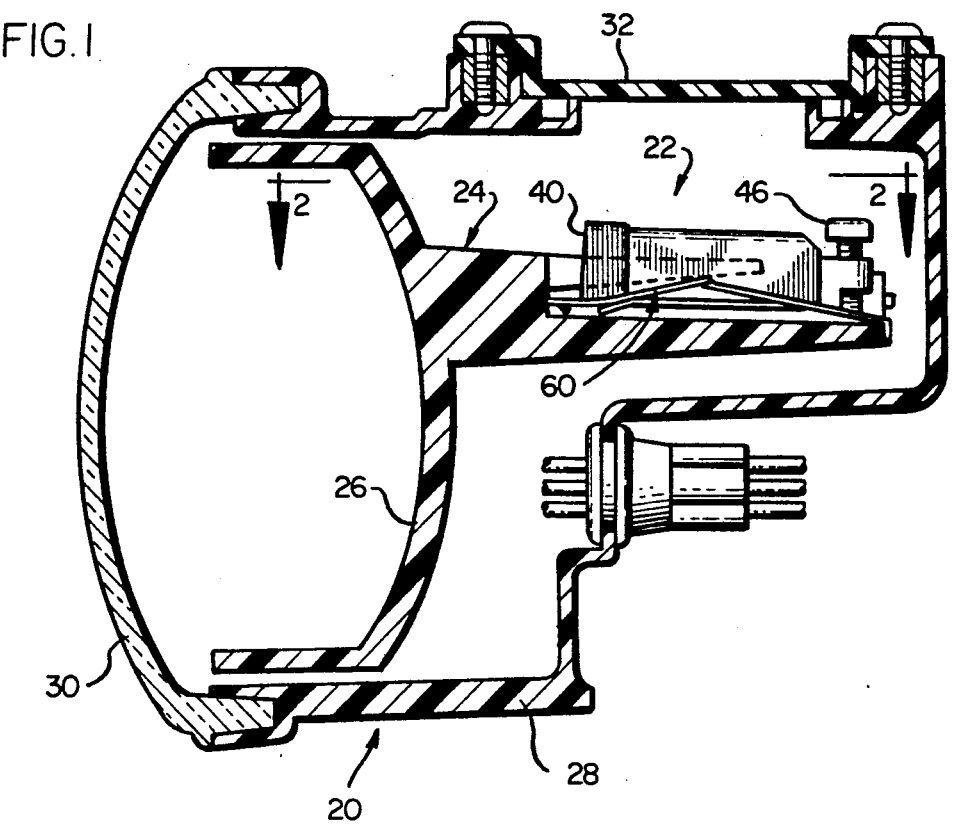
FIG. 1 is a side elevation of a headlamp aiming and leveling apparatus in accordance with the invention in connection with a section through an automotive headlamp assembly to which the same is mounted.
Figure 2:
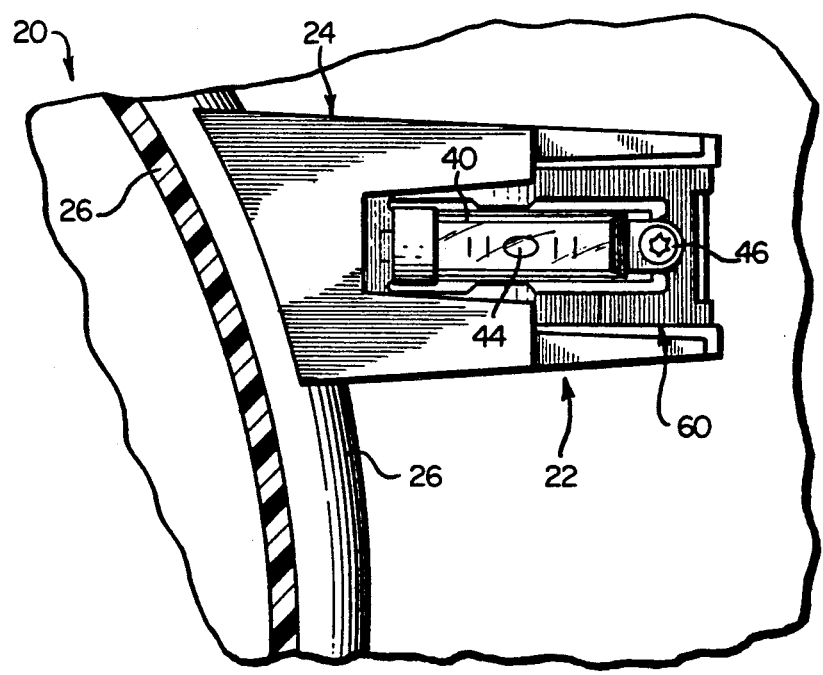
FIG. 2 is a partial sectional view taken generally along the line 2—2 of FIG. 1.

Referring now to the drawings, and initially to FIGS. 1 and 2, there is shown in somewhat diagrammatic form a headlamp assembly in connection with which the invention may advantageously be utilized, and designated generally by the reference numeral 20. A headlamp aiming and leveling apparatus 22, in accordance with the invention, is mounted to a portion of the headlamp assembly, and preferably to a mounting member or bracket 24, which extends from a rear wall of an internal reflector member or reflector support wall 26. In the illustrated embodiment, the mounting bracket 24 is integrally formed with the wall 26, however, the invention is not so limited. The headlamp assembly also includes an external housing or shell portion 28. Preferably the headlamp beam is aimed by adjusting the reflector 26.

A transparent front lens portion 30 is attached to this housing 28 and support wall or reflector portion 26. In order to permit viewing of the aiming and leveling apparatus 22 from externally of the housing 28, there is provided a transparent panel or window 32 located in alignment with and above the aiming and leveling apparatus 22. However, the transparent window 32 may also be located in other locations from which a clear view of the leveling apparatus 22 may be had, as will be appreciated later herein. Moreover, as will be more fully described later, a prism, mirror or other reflective means, may be utilized in connection with apparatus 22 to permit viewing thereof from other orientations relative to the headlamp assembly 20.

Referring now also to FIGS. 3-7, the aiming and leveling apparatus 22 comprises a level member 40 which includes a housing 42, at least a portion of which is transparent to view indicating means 44 located within the housing. Preferably the housing 42 forms a spirit or bubble-type level with the level indicating means comprising the fluid and bubble held within the housing 42. A major portion of housing 42 may be transparent to allow viewing of the indicating means 44 therethrough.

The apparatus 22 further includes an adjustment member 46 which, in the illustrated embodiment takes the form of a threaded fastener having a driver head portion 48 and threaded shaft 50. Preferably the threaded shaft 50 is engaged with a complementary internally threaded bore, extending through an end part of the housing 42. As will be more fully appreciated later, the adjustment member 46 is utilized to adjust the position of the end part of housing 42 and thereby adjust the indication given by the indicating means 44 therewithin, to indicate a level or unlevel condition of the level member 40. As best viewed in FIG. 1, in the illustrated embodiment, the threaded fastener extends through the housing and an end portion 51 thereof bears against an abutment surface which will be described more fully later herein, to thereby adjust the elevation of the associated end of the level member 40 relative to the bracket or mounting portion 24.

As best viewed in FIG. 3, the apparatus of the invention also includes a retaining clip 60 for mounting the level member 40 relative to the headlamp assembly 20 and particularly relative to the mounting bracket or portion 24. Preferably the retaining clip 60 is formed of an elastically deformable metallic material such as a sheet of stainless steel, as by a stamping operation. It will be seen that the clip 60 is formed with a number of preshaped surface portions which, in operation, cooperate in spring-like fashion for retaining the level member 40 assembled with the clip 60, and also for retaining the clip 60 in assembled condition with the bracket or mounting member or portion 24. In the illustrated embodiment, the retaining clip 60 includes a locking means or portion 62 which comprises a generally U-shaped cutout or aperture 62 for receiving a complementary formed, forwardly-projecting locking tab portion 64 of the housing 42. The locking means of the clip member 60 also includes a projecting portion 66, generally defined by the cutout portion 62 which extends behind and engages a trailing portion of the tab 64, as best viewed in FIG. 6, when the housing 42 is assembled with the clip 60.

The clip 60 also includes retaining means which, in the illustrated embodiment, take the form of a plurality of struck-out barb-like portions 68, 68 and 70, 70 at the peripheral side edges thereof for engaging the material of the bracket 24 when the same is assembled therewith. Preferably the struck-out members 68 are struck out in a direction opposite the direction of insertion of the clip 60 to the bracket 24 as best viewed in FIGS. 4 and 5, so as to resiliently deform to permit insertion thereof and yet oppose withdrawal thereof in the opposite direction once inserted and assembled, in the manner of projecting barbs.

The retaining clip also includes cooperating adjustment means in the form of a projecting bearing surface 72 which, when the clip and level member 40 are assembled with the bracket 24, is aligned with the projecting end portion 51 of the adjustment member or fastener 46, to thereby permit adjustment of the height of an end portion of the housing 42 relative thereto, as best viewed in FIGS. 1 and 2. Accordingly, upon installation of the apparatus of the invention with a headlamp assembly as shown in FIG. 1, the adjustment member 46 may be adjusted until the level member 40 indicates a level condition when the headlamp is in the desired level condition. Thereafter, upon installation of the headlamp in an automotive vehicle, the headlamp may be adjusted until the indicating means 44 again indicates a level condition to thereby assure proper leveling and aiming of the headlamp and headlamp beam relative to a vehicle upon which the headlamp is installed. This of course assumes that the vehicle is on a level surface.

As previously indicated, the retaining clip 60 is formed for positively engaging the housing 42 in a resilient, spring-like fashion. More specifically, the clip 60 is formed with a resilient biasing means in the form of a generally centrally located struck-out member or portion 74 thereof, which is generally bent away from the plane of the undeformed clip member to define a resilient biasing member for bearing against the housing 42. Portion 74 defines a peripheral frame-like clip body portion 75 therearound. Cooperatively, the housing 42 includes a further pair of laterally projecting tabs 76, 76 to either side of the end thereof through which adjustment member 46 projects. Upon assembly, the struck out portion 74 is bent back upwardly through an opening 78 defined in the clip 60 by the striking out thereof until a pair of projecting parallel fingers 80, 80 thereof engage over either side of tabs 76, 76. This tends to draw struck-out portion 74 back toward its initially generally planar alignment to biasedly engage the housing 42 with the clip 60. It will be noted that the arms or fingers 80, 80 impart a generally U-shaped configuration to the end of struck-out member 74 from which they project, as best viewed in FIG. 5.

Referring now to the mounting member or bracket 24, in the illustrated embodiment it is preferably formed integrally with the headlamp assembly 20, although it may be provided as a separate member if desired. This mounting member or bracket defines an elongate mounting slot 90, which is formed for receiving and engaging the clip 60. To this end, an outer or peripheral frame-like body portion 75 of clip 60 is also preferably initially formed in a bent-over or deformed condition to similarly impart resiliency and a resilient, spring-like engagement thereof with the slot 90 when the same is slidably inserted as indicated generally in FIGS. 4 and 5.

More particularly, the mounting slot means comprise two pairs of inwardly converging surfaces 92, 92 and 94, 94 which are located and spaced in parallel condition on the mounting member or bracket 24 and define respective inwardly converging slots 90, 90 for slidably receiving the retaining clip therewithin. Cooperatively, the previously described protruding barbs 68, 68 and 70, 70 project generally outwardly and rearwardly relative to the direction of insertion of the clip in the mounting member for engaging one or the other of the converging surfaces 92, 94 in such a manner as to permit insertion of the clip, but generally to resist removal of the retaining clip from the mounting member, once assembled therewith. In this regard, the mounting member or bracket 24 is preferably formed of a relatively soft or plastic material, which the harder metallic and preferably stainless steel of the clip and hence of the barbs would bitingly engage upon an attempt to move the clip backwardly in the direction for removal, once assembled therewith.

Further, the retaining clip includes means defining stops for defining an assembled relation between the clip and the headlamp, and particularly the mounting means or bracket 24. In the illustrated embodiment, the stop means on the clip member 60 comprise at least one and preferably two symmetrically formed downwardly bent edge or end tab portions 96, 96 at the trailing end portion thereof with respect to the direction of insertion thereof relative to slots 90, 90. These downwardly bent portions or tabs will be seen to engage a corresponding outer end surface of the bracket or mounting member upon full advancement and insertion of the retaining clip 60 therewithin to thereby define the assembled relationship therebetween.

Figure 8:
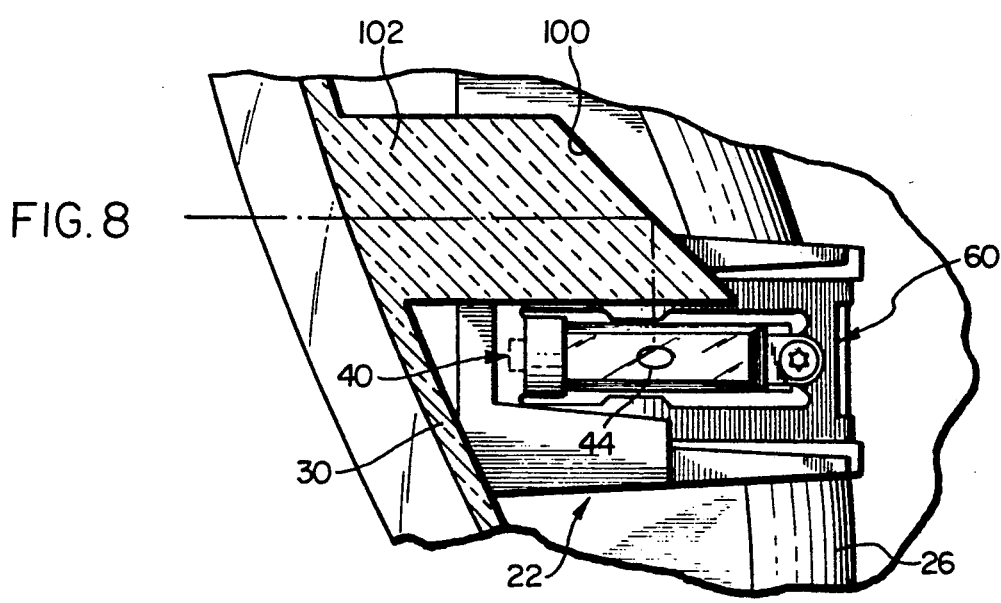
FIG. 8 is a top plan assembled view similar to FIG. 2 of an alternate embodiment of the invention.
Figure 9:
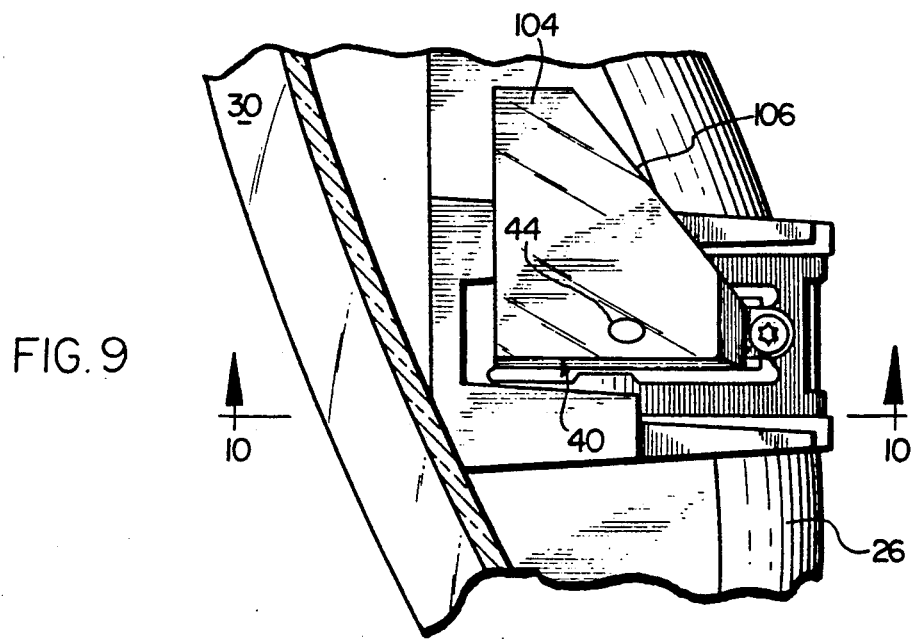
FIG. 9 is a top plan view similar to FIGS. 2 and 8, of a second alternate embodiment of the invention.
Figure 10:
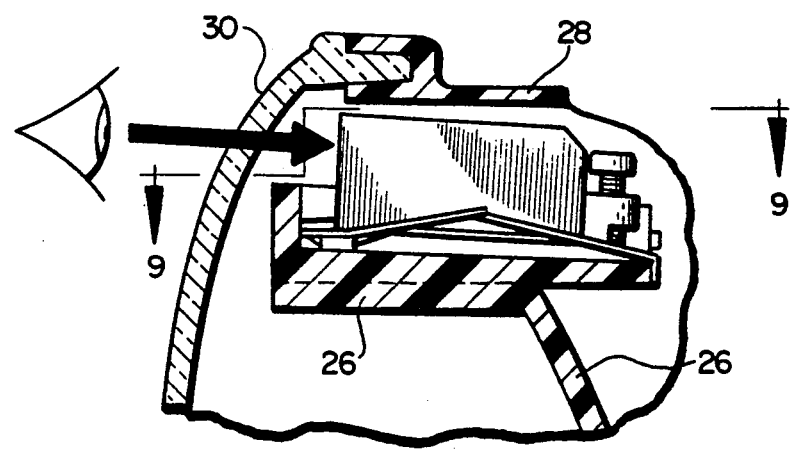
FIG. 10 is a sectional view taken generally along the line 10—10 of FIG. 9.

Referring to the remaining FIGURES, as previously indicated, additional reflective means may be provided to permit viewing of the level indicating means 44 from some other orientation relative to the headlamp assembly 20. In the alternate embodiment illustrated in FIG. 8, this reflective means takes the form of a reflective surface 100, which is positioned for viewing through the transparent portion 30 of the headlamp assembly. In the embodiment of FIGS. 9 and 10, a solid, prism-like member 104 is provided in much the same configuration and position as reflective member or surface 100 in FIG. 8. The prism 104 may be provided separately, or, as shown in FIGS. 9 and 10, integrally formed with the housing 42 which defines the level member. The prism has a reflective surface 106 which permits similar viewing from the front of the headlamp assembly through transparent lens 30.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A headlamp aiming and leveling apparatus comprising: a level member including a housing and indicating means for indicating the condition of said housing relative to a level condition and located within said housing, at least a portion of said housing being transparent to permit viewing of said indicating means therewithin; an adjustment member operatively coupled to said housing for adjusting the position thereof, and thereby adjusting the indication given by the indicating means; and a resilient retaining clip, separate and independent of said headlamp and of said level member, for receiving said level member and engaging the same in a spring-like fashion mounting said level member to a headlamp, said retaining clip including locking means for engaging said housing, retaining means for retaining said retaining clip in retaining said retaining clip in assembled relation with said headlamp in a spring-like fashion when said retaining clip has been assembled with said headlamp, and cooperating adjustment means for cooperating with said adjustment member to achieve adjustment of said indicating means so as to indicate a level position when the associated headlamp is in a desired level condition, whereby upon installation of said headlamp upon an automotive vehicle, said headlamp may be adjusted until said indicating means again indicates said level condition, to thereby assure proper leveling and aiming of the headlamp beam relative to a vehicle upon which the headlamp is installed.

2. Apparatus according to claim 1 wherein said adjusting member comprises an elongate threaded member and a complementary threaded through aperture in an end part of said housing for receiving said elongate threaded member for bidirectional threadable movement therethrough.

3. Apparatus according to claim 2 wherein said cooperating adjusting means comprises a bearing surface defined on said retaining clip located for receiving an end portion of said elongate threaded member bearing thereagainst to thereby permit relative adjustment of the height of said end part of said housing through which the elongate threaded member extends relative to said clip, to correspondingly adjust the indication given by the indicating means.

4. A headlamp assembly comprising: a headlamp, aiming and leveling apparatus and mounting means for mounting said aiming and leveling apparatus relative to said headlamp for aiming a beam thereof, said leveling and aiming apparatus including a level member comprising a housing and indicating means for indicating the condition of said housing relative to a level condition and located within said housing, at least a portion of said housing being transparent to permit viewing of said indicating means therewithin;

an adjustment member operatively coupled to said housing for adjusting the position thereof, and thereby adjusting the indication given by the indicating means;

a retaining clip for mounting said level member to a headlamp, said retaining clip including locking means for engaging said housing, retaining means for retaining said retaining clip in assembled relation with said headlamp, and cooperating adjustment means for cooperating with said adjustment member to achieve adjustment of said indicating means so as to indicate a level position when the associated headlamp is in a desired level condition, whereby upon installation of said headlamp upon automotive vehicle, said headlamp may be adjusted until said indicating means again indicates said level condition, to thereby assure proper leveling and aiming of the headlamp beam relative to a vehicle upon which the headlamp is installed; and said mounting means including means defining mounting slot means for receiving and engaging said retaining clip in assembled condition therewith; and further including a mounting member mountable to said headlamp and defining mounting slot means for receiving and engaging said retaining clip in assembled condition therewith.

5. A headlamp aiming and leveling apparatus comprising: a level member including a housing and indicating means for indicating the condition of said housing relative to a level condition and located within said housing, at least a portion of said housing being transparent to permit viewing of said indicating means therewithin;

an adjustment member operatively coupled to said housing for adjusting the position thereof, and thereby adjusting the indication given by the indicating means;

and a retaining clip for mounting said level member to a headlamp, said retaining clip including locking means for engaging said housing, retaining means for retaining said retaining clip in assembled relation with said headlamp, biasing means for exerting a biasing force against said housing to positively engage and retain said housing, and cooperating adjustment means for cooperating with said adjustment member to achieve adjustment of said indicating means so as to indicate a level position when the associated headlamp is in a desired level condition, whereby upon installation of said headlamp upon an automotive vehicle, said headlamp may be adjusted until said indicating means again indicates said level condition, to thereby assure proper leveling and aiming of the headlamp beam relative to a vehicle upon which the headlamp is installed;

wherein said housing further includes tab means for engagement by the clip locking means and the clip biasing means; wherein said retaining clip initially comprises a generally flat resilient member and wherein said biasing means comprises a generally centrally located struck-out member bent away from the plane of said clip to define a resilient biasing member for bearing against said housing, and wherein said housing tab means include outwardly projecting tab means for engaging both an end part of said biasing member and a peripheral surface of a through opening formed in said retaining clip by the striking-out thereof, to thereby draw said struck-out biasing member back toward its initial generally planar alignment to thereby biasedly engage said housing therewith.

6. A headlamp assembly comprising: a headlamp and headlamp aiming and leveling apparatus attachable to said headlamp, and said headlamp including a mounting portion having a pair of adjacent, spaced slot means formed therein, with an open area between said slot means, with said slot means being designed for receiving said aiming and leveling apparatus such that said aiming and leveling apparatus may be viewed through said open area when assembled to said headlamp, said aiming and leveling apparatus including a level member comprising viewable indicating means sensitive to the relative position of said level member, and an adjustment member operatively coupled to said level member for adjusting the position thereof and correspondingly adjusting the indication provided by said indicator means, and mounting means for mounting said aiming and leveling apparatus in said adjacent, spaced slot means, with said level member disposed in said open area for viewing, said mounting means including a pair of extensions on opposite sides of said level member which extensions include spring members to engage the walls of said slot means and thereby frictionally positioning the aiming and leveling apparatus in said slot means.

7. A headlamp aiming and leveling apparatus comprising: a level member including a housing and indicating means for indicating the condition of said housing relative to a level condition and located within said housing, at least a portion of said housing being transparent to permit viewing of said indicating means therewithin;

an adjustment member operatively coupled to said housing for adjusting the position thereof, and thereby adjusting the indication given by the indicating means;

and a retaining clip for mounting said level member to a headlamp, said retaining clip including locking means for engaging said housing, retaining means for retaining said retaining clip in assembled relation with said headlamp, stop means for defining said assembled relation between said retaining clip and said headlamp, and cooperating adjustment means for cooperating with said adjustment member to achieve adjustment of said indicating means so as to indicate a level position when the associated headlamp is in a desired level condition, whereby upon installation of said headlamp upon an automotive vehicle, said headlamp may be adjusted until said indicating means again indicates said level condition, to thereby assure proper leveling and aiming of the headlamp beam relative to a vehicle upon which the headlamp is installed.

8. Apparatus according to claim 7 wherein said stop means comprises at least one projecting tab member located at an end portion of said retaining clip for engaging a corresponding surface of said headlamp upon full engagement of said retaining clip therewith, to define said assembled relation therebetween.

9. A headlamp aiming and leveling apparatus comprising: a level member including a housing and indicating means for indicating the condition of said housing relative to a level condition and located within said housing, at least a portion of said housing being transparent to permit viewing of said indicating means therewithin;

an adjustment member operatively coupled to said housing for adjusting the position thereof, and thereby adjusting the indication given by the indicating means;

a retaining clip for mounting said level member to a headlamp, said retaining clip including locking means for engaging said housing, retaining means for retaining said retaining clip in assembled relation with said headlamp, and cooperating adjustment means for cooperating with said adjustment member to achieve adjustment of said indicating means so as to indicate a level position when the associated headlamp is in a desired level condition, whereby upon installation of said headlamp upon an automotive vehicle, said headlamp may be adjusted until said indicating means again indicates said level condition, to thereby assure proper leveling and aiming of the headlamp beam relative to a vehicle upon which the headlamp is installed; and a mounting member mountable to said headlamp and defining mounting slot means for receiving and engaging said retaining clip in assembled condition therewith.

10. Apparatus according to claim 9 wherein said mounting slot means comprise two pairs of inwardly converging surfaces located and spaced in parallel condition on said mounting member and defining respective inwardly converging slots for slidably receiving said retaining clip therewithin.

11. Apparatus according to claim 10 wherein said retaining means comprises at least one protruding barb on said retaining clip which projects generally upwardly and rearwardly relative to the direction of insertion of the clip in said mounting member for engaging one of said converging surfaces of said retaining member so as to permit insertion of said clip member but generally engage said surface to resist removal of said retaining clip from said mounting member.

12. A headlamp aiming and leveling apparatus for use with a headlamp assembly having mounting means in the form of a pair of adjacent, spaced slot means with an open area therebetween, said slot means receiving said aiming and leveling apparatus and said open area permitting viewing of said aiming and leveling when mounted to said slot means, said aiming and leveling apparatus including: a level member comprising a viewable indicating means; an adjustment member operatively coupled to said housing for adjusting the position thereof and correspondingly adjusting the indication provided by said indicating means; and mounting means for mounting said aiming and leveling apparatus in said slot with said level member disposed in said open area, said mounting means including a pair of extensions on opposite sides of said level member which extensions include spring members such that said spring members engaging the walls of said slots to frictionally position said headlamp aiming and leveling apparatus therein.

13. A headlamp aiming and leveling apparatus according to claim 12, wherein said aiming and leveling apparatus further includes means on said extensions for maintaining and positioning the aiming and leveling apparatus in said slots.

14. An aiming and leveling apparatus according to claim 12, wherein said spring members are provided by a metal clip.

15. A headlamp aiming and leveling apparatus according to claim 12, wherein said adjusting member comprises a screw member, and said aiming and leveling apparatus further includes cooperating adjustment means which cooperates with said adjustment member to achieve adjustment of said level member, said cooperating adjustment means being in the form of a section of metal material against which the end of said screw will bear when said aiming and leveling apparatus is assembled in said slot.

16. A headlamp aiming and leveling apparatus according to claim 12, wherein said mounting means is provided by a resilient retaining clip to which said level member is engaged, said retaining clip including means thereon for engaging the walls of said slot means for defining and maintaining the assembled relation between said headlamp aiming and leveling apparatus, and said headlamp.

17. A headlamp aiming and leveling apparatus according to claim 16, wherein said means for engaging the walls of said slot means comprise spring members struck from said retaining clip.

* * * * *